June 30, 1970  G. COURCHESNE  3,517,601
AIR INTAKE, MIXER AND RECIRCULATOR SYSTEM
Filed June 21, 1968  2 Sheets-Sheet 1
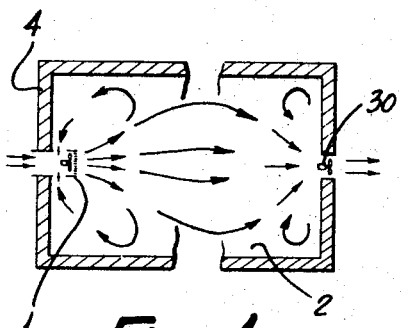
Fig. 1
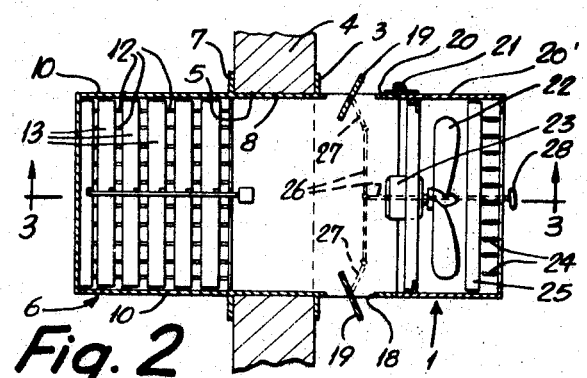
Fig. 2
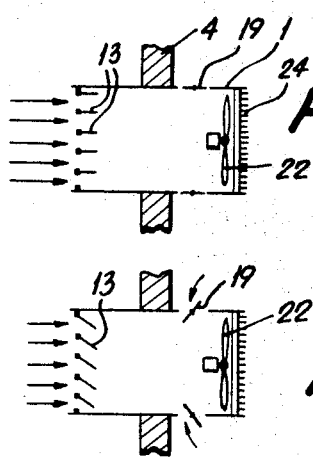
Fig. 4
Fig. 5
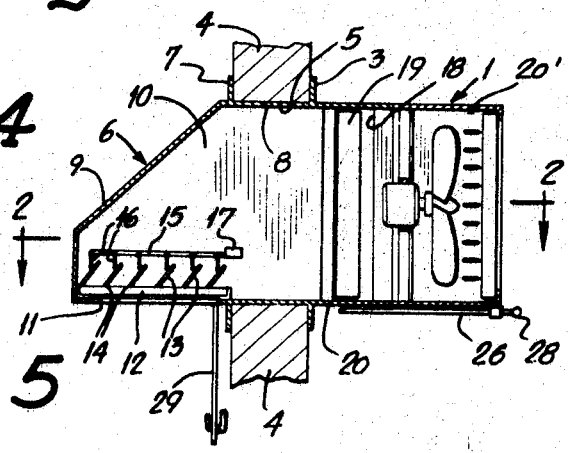
Fig. 3
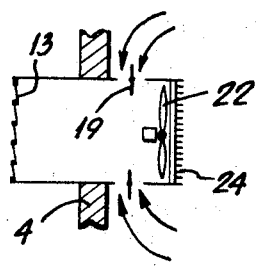
Fig. 6
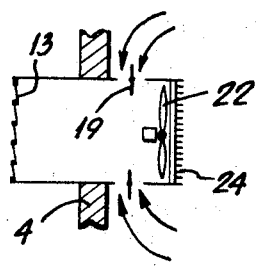
Fig. 7
INVENTOR
Germain COURCHESNE
By Pierre Lespérance
AGENT

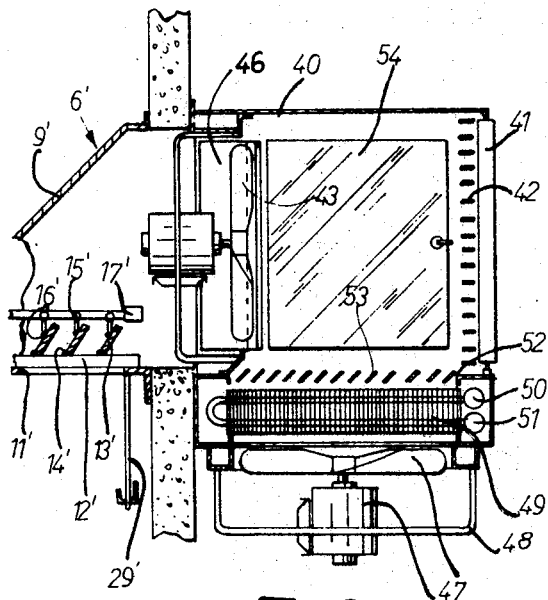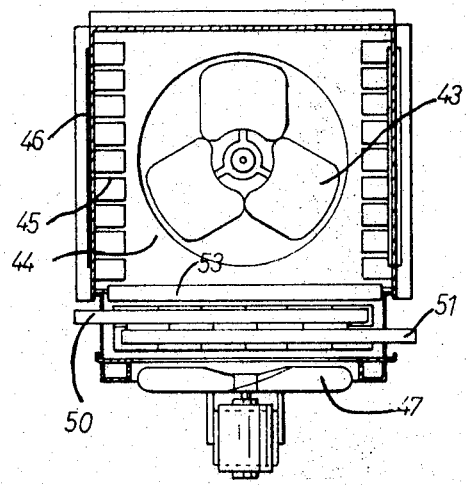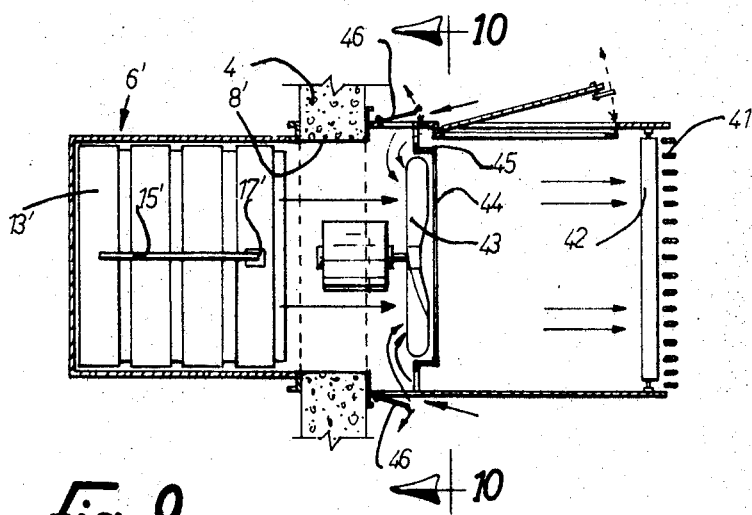

United States Patent Office 3,517,601
Patented June 30, 1970

3,517,601
AIR INTAKE, MIXER AND RECIRCULATOR SYSTEM
Germain Courchesne, 167 Chemin du Golf,
Drummondville, Quebec, Canada
Filed June 21, 1968, Ser. No. 739,075
Claims priority, application Canada, June 24, 1967,
993,913
Int. Cl. F24f *13/00*
U.S. Cl. 98—33        9 Claims

ABSTRACT OF THE DISCLOSURE

A ventilating system for a room comprising the combination of an air intake, mixer and recirculator apparatus with an exhaust ventilator, said apparatus capable of operating in such a manner that the exhaust ventilator controls the admission of fresh air into the apparatus and, consequently, into the room to be ventilated. Thus, the system enables to obtain complete air recirculation at all times to prevent air stratification within the room with automatic suitable addition and complete mixing of fresh air, according to the needs, with practically no change of the static pressure within the room. In case the temperature differential between the room and the outside is too small or inexistent, damper doors on the apparatus can be closed to stop the air recirculation and the air circulating means within the apparatus, together with the exhaust ventilator, will then operate in series to increase the admission of fresh air.

---

The present invention relates to a system for ventilating closed rooms and has for its object the combination of an exhaust ventilator with an air intake ventilator, the latter recirculating inside air, admitting fresh air and mixing the latter with the inside air.

Another object of the invention consists in the provision of a ventilating system of the character described, which can be operated in such a manner that inside air can be recirculated within the room independently of the fresh air admission, the latter being solely controlled by the exhaust ventilator.

Another object of the invention consists of a ventilating system of the character described, in which the air intake ventilator which serves to recirculate the air, serves also to completely mix the fresh air with the recirculated air before it is discharged into the room, to thereby prevent unmixed cold air from entering the room.

Another object of the invention resides in the provision of a ventilating system of the character described, which can provide complete air recirculation to prevent air stratification within the room with automatic suitable addition and complete mixing of fresh air, according to the needs, with practically no change of the static pressure within the room.

Another object of the invention resides in the provision of a system of the character described, wherein the air circulating means of the intake and exhaust ventilators can operate in series to increase the admission of fresh air when the outside temperature is high or nearly equal to that of the room.

Another object of the invention consists of providing means to vary the proportions of fresh air and inside air in the intake ventilator in accordance with the external temperature, whereby to maintain proper ventilation inside the room while reducing heating cost to a minimum.

Another object of the invention consists in providing a ventilator system which, when controlled by thermostats and/or humidistats, enables to obtain automatic ventilation of a closed room in all weather, while maintaining proper temperature and/or humidity inside the room.

Another object of the invention resides in the provision of a system of the character described, provided with its own air heating means.

Another object of the invention is to provide an intake ventilator of the recirculating and mixing type, which is of novel and improved construction.

The foregoing and other objects of the present invention will become more apparent during the following disclosure and by referring to the drawings, in which:

FIG. 1 is a schematic plan view of a room provided with air intake and exhaust ventilators in accordance with the invention;

FIG. 2 is a top plan section of the air intake ventilator, taken along line 2—2 of FIG. 3;

FIG. 3 is a vertical section taken along line 3—3 of FIG. 2;

FIGS. 4 to 7 are schematic plan sections of the air intake ventilator in different conditions of operations;

FIG. 8 is a longitudinal vertical section of a modified embodiment of the intake ventilator incorporating heating means;

FIG. 9 is a top plan section of the embodiment of FIG. 8; and

FIG. 10 is a cross-section taken along line 10—10 of FIG. 9.

In the drawings, like reference characters indicate like elements throughout.

A casing 1 is disposed inside a room or enclosure 2 which it is desired to ventilate.

Casing 1 is provided at one end with a flange 3 secured to the inside face of an external wall 4 of enclosure 2 and such that the casing 1 is in communication with an opening 5 made in wall 4.

A hood 6 provided with a flange 7 is secured to the external face of wall 4 by said flange and is in register with opening 5. The surfaces of opening 5 can be covered with a lining 8. Casing 1 and hood 6 form the air intake ventilator housing. Hood 6 has an inclined top 9 and lateral walls 10 and the bottom of the hood forms an air intake opening 11, preferably protected by a screen 12.

A series of parallel shutters 13 are disposed within hood 6 in register with opening 11. The shutters are pivoted at their lower edge at 14 to the lateral walls 10 of the hood and are in the form of slats interconnected by a transverse rod 15 pivoted to arms 16 secured to louvers 13 near the upper edge thereof.

Rod 15 may carry, if necessary, a longitudinally adjustably positioned weight 17.

When air does not enter hood 6 through opening 11, shutters 13 automatically take a lowered closed position under their own weight, assisted, if desired, by weight 17, thereby closing opening 11 to prevent back draught. Moreover, a depression caused in hood 6 will produce automatic opening of louvers 13. The depression required for such opening depends on the position of weight 17 along rod 15.

Opening 11 is completely at the exterior of wall 4 and consequently of the building in which room 2 is located.

Shutters 13 are preferably composed of a double sheet metal thickness with insulating material in between, such as compressed pulpwood or the like, to prevent the formation of frost on the inside faces of said louvers in cold weather.

For the same reason, the inside of hood 6 is preferably lined with an insulating material.

The lateral walls of casing 1 are each provided with a damper opening 18 adjacent the inside surface of wall 14, said openings 18 being generally rectangular and vertically disposed. The openings 18 can be completely closed by dampers 19 centrally pivoted along a vertical axis.

Casing 1 is preferably composed of two parts, namely: a fixed part 20 provided with the register openings 18 and a part 20' which is pivotally connected by hinges 21 to fixed part 20, whereby part 20' can be swung about a vertical axis to give access to the inside of the casing.

A fan 22, driven by electric motor 23, is mounted inside part 20', the motor being secured to said part by supports 23'. Fan 22 is preferably of the propeller type but could be replaced by any other type of air blower. Downstream from the fan is disposed a conventional louver system comprising horizontal louvers 24 and vertical louvers 25, all of said louvers being orientable to direct air at the desired horizontal and/or vertical angle.

The dampers 19 are provided with springs (not shown), normally maintaining the same in closed position. They can be simultaneously open at the same angle by, for instance, chain 26 attached to arms 27 secured to each damper 19. Chain 26 extends forwardly of the apparatus and is provided with a pull knob 28. A chain blocking system, not shown serves to maintain the dampers 19 in the desired angular position.

The air intake ventilator just described is used in combination with one or more exhaust fans, one of which is shown at 30 in FIG. 1. This exhaust fan is of conventional construction and serves to discharge air from the room to the exterior. The system of the invention operates as follows:

When exhaust fan 30 is operating, it produces partial vacuum in room 2.

When fan 22 is operating, air is drawn from the plenum formed by casing 1, hood 6 and lining 8 and is discharged between louvers 24 and 25 inside room 2. When the dampers 19 are completely closed, the only air discharged by fan 22 will be exterior air entering through opening 11 of hood 6 and passing between shutters 13 see FIG. 4. When the dampers 19 are completely open and when exhaust fan 30 is not operating, shutters 13 are completely closed and the air coming from room 2 is recirculated completely by fan 22 without additional fresh air as shown in FIG. 7. When the dampers 19 are completely open and exhaust fan 30 is operating, the depression caused in the room by the exhaust fan results in an increase of the depression in the mixing chamber of the air intake ventilator, producing automatic opening of the shutters 13 for the admission of fresh air, while still maintaining complete recirculation of the inside air. The fresh air is completely mixed with the inside air within casing 1, before being discharged into the room between louvers 24 and 25. This condition is shown in FIG. 6 and also in FIG. 1. Thus, one obtains complete recirculation of the inside air to prevent air stratification within the room with automatic suitable addition of fresh air by the operation of the exhaust fan under the control of a thermostat or humidistat. The fresh air is completely mixed with the recirculated air within the intake ventilator housing and, consequently, there is no localized temperature drop in the room. There is also practically no change of the static pressure within the room. In the open position of the dampers 19, it will be noted that the operation of the shutters 13 is solely dependent on the operation of the remotely located exhaust fan 30. Obviously, to obtain this result, the relationship between the size of the damper openings, the air flow producing capacity of the fan 22 of the air intake circulator for a given static pressure differential between the room and the air mixing chamber of the intake ventilator and the pressure differential between the exterior and the air mixing chamber necessary to open the shutter system 13, is such that when the dampers are fully open, automatic closing and opening of the shutter system depend on the non-operation and operation of the exhaust ventilator.

Referring again to FIG. 4, where the dampers 19 are closed, it will be appreciated that, when the exhaust fan 30 is operating, together with fan 22 of the intake ventilator, the two fans are operating in series to increase the admission of fresh air into the room.

In the intermediary position of dampers 19, as shown in FIG. 5, a certain quantity of fresh air enters hood 6 while a certain portion of the air from the room 2 enters through register openings 18 within casing 1.

Thus, by properly opening the dampers 19, one can obtain any desired proportion of a mixture of fresh and inside air between 100% fresh air and 100% inside air.

In cold weather and in all cases in which it is not desired to admit exterior air, an insulated trap door 29 pivoted underneath the hood, closes opening 11. In this case, hood 6 being completely closed, air is circulated by the fan and entering casing 1 and the hood 6 will not be cooled and will not cause frost, because trap door 29 together with hood 6 are insulated against cold.

In cold weather, room 2 is normally heated by a conventional heating system provided with a thermostat disposed at normal height in the room. The intake and exhaust ventilators can function in a completely automatic manner by means of a thermostat which will control the motors of these ventilators and disposed in high place in the room and set at about 1 degree higher than the setting of the heating system thermostat. After stopping of the ventilators for a certain period of time, the air in the room will become stratified and the warmer air in the higher portion of the room will cause operation of the ventilators and therefore cause change of air in the room in an automatic manner until a certain proportion of fresh air has entered the room, thereby causing stopping of the ventilators.

Moreover, the heating system can be provided with a humidistat in place of a thermostat in cases in which the inside air tends to become too humid. In this case, when the air is too humid, the heating system starts increasing the temperature in the room and, therefore, causing operation of the ventilators through their thermostat, which ventilators will cause air recirculation and admit fresh air inside the room.

One can provide a system in which both intake and exhaust ventilators will be provided with their own thermostat, the thermostat of the intake ventilator set at one or two degrees Fahrenheit lower than the thermostat of the exhaust ventilator. In this case, after a certain stop period of the ventilators and a consequent air stratification in the room, the intake ventilator will start first to recirculate the air in the room and eliminate air stratification, the register doors 19 being in completely open position. In this case, there is no fresh air at all which will enter the room. However, if the temperature in the top zone of the room is too high, then the exhaust ventilator starts, thereby causing a demand for fresh air which mixes with recirculated air and therefore gradually lowers the temperature of the air in the top zone of the room without causing cold air currents.

As mentioned hereinabove, the intake ventilator has the advantage of being able to mix hot air within the room with cold air from the outside, whereby the air stream discharged by the ventilator is at an already relatively high temperature which will not affect persons or animals in the room. Thus, the ventilator system of the invention enables to ventilate a room without too sudden temperature changes. This is very important in applications such as chicken houses, chickens being known as being very sensitive to temperature variations and, moreover, requiring very good air ventilation due to the considerable number of chickens normally found in a modern chicken house.

The conventional way of ventilating a chicken house is to simply make horizontal slots along the exterior walls of the chicken house at a certain height from the various floors and to provide these slots with manually-operated shutters.

In cold weather, the exterior air entering through these slots directly falls down on the chickens, often resulting in sickness.

To obviate this disadvantage, it is necessary to constantly vary the opening of the shutters in order to prevent the air from directly falling down on the chicken while still maintaining proper ventilation.

In accordance with the invention, good ventilation is obtained while discharging air which is pre-heated to a certain extent and the ventilation is completely, or almost completely, automatic. In practice, there will be need to manually vary the position of the dampers 19 only a few times a year, namely in very cold weather, in which case trap door 29 is closed while dampers 19, are fully open, in order to obtain recirculation of the inside air by the air intake ventilator and thereby eliminate air stratification.

In milder winter weather, trap door 29 is opened and dampers 19 completely open, as shown in FIG. 6, which will cause a certain amount of fresh air to enter the room when the exhaust fans are operating. Inversely, when the exhaust ventilators are stopped, shutters 13 automatically close and the intake ventilator continues to recirculate the inside air. Thus, when dampers 19 are completely open, opening and closing of the shutters 13 are entirely dependent on the operation and non-operation of the exhaust ventilators, irrespective of whether or not the intake ventilator fan is operating.

In the spring or fall, the dampers 19 will be adjusted to a mid-position, as shown in FIG. 5, in order to increase the proportion of fresh air mixed with recirculated air. During summer, the dampers 19 will be completely closed, as shown in FIG. 4, to obtain 100% fresh air. Obviously, other methods of operating the intake and exhaust ventilators can be contemplated. For instance, one can operate the air intake ventilator with the dampers 19 completely open practically the entire year, except in warm weather when the dampers 19 are then completely closed to admit only fresh air and benefit from the operation of the two ventilators in series. Thus, during most of the year, admission of fresh air will be dictated solely by the operation or non-operation of the exhaust ventilator. Obviously, one can vary the number and location of intake and exhaust ventilators in accordance with the size and form of the room to be ventilated.

Referring to FIG. 5, it will be seen that the relatively warm inside air is directed towards the hood, thereby melting any frost which may be formed on the inside surfaces of the hood and shutters.

Concerning the intake ventilator in accordance with the invention, it is obvious that hood 6 and part 20 of casing 1 can be made in one unit and part 20' of the casing, when open, enables to clean the inside surfaces of the ventilator and to repair the fan.

It should be noted that dampers 19, when in open position, serve to direct the inside air into the mixing chamber of the casing closer to the fan with the degree of opening of the doors, in order to always effect a complete mixing of the fresh and inside air.

The air intake ventilator can be combined with a heating unit to heat the room in which the ventilator system is installed, thereby eliminating any separate heating units.

FIGS. 8 to 10 show such an embodiment.

This system includes a hood 6', as in the first embodiment, secured to the exterior of wall 4 and including an inclined top wall 9', a bottom opening 11'; if desired, a screen 12'. Automatic shutters 13' are pivoted at their lower end at 14' and are connected to a common rod 15' by arm 16', said common rod having a longitudinally adjustable weight 17'.

Opening 11' may be shut by a trap door 29'. The hood, shutters and trap door are preferably heat insulated.

On the inside of the wall 4, is secured a casing 40 in communication with the hood 9' through opening 8' made in wall 4. The front of casing 40 is open and provided with adjustable vertical and horizontal louvers 41 and 42 respectively, as in the previous embodiment.

An electric motor-operated fan 43 is mounted in casing 40 and the fan is surrounded by a shield 44, having a series of superposed lateral holes 45.

The side walls of casing 40 upstream from fan 43 are provided with vertical generally rectangular elongated openings adjustably closed by pivoted dampers 46. Casing 40 is longer than the casing of the first embodiment so as to incorporate a heating element and an additional fan.

The motor-operated fan, indicated at 47, is secured by bracket 48 underneath the open bottom of casing 40.

Fan 47 is arranged to rotate about a vertical axis to discharge air from the inside of the room directly into the casing 40 downstream from fan 43. The air is heated by passing between the fins of a steam or hot water heating radiator 49 mounted in the bottom opening 52 of the casing and fed with steam or hot water by inlet and outlet pipes 50, 51 respectively.

Opening 52 is preferably provided with adjustable louvers 53, so as to direct the hot air inside the casing at any desired angle.

Casing 40 may be provided with a service door 54 pivoted on one side thereof.

One or more heating, air mixer and recirculator units are used in combination with one or more exhaust fans, as shown at 30 (FIG. 1), sufficient to heat the entire room 2 while insuring proper ventilation.

The shutters 13' open automatically whenever there is a depression inside hood 6', as in the previous embodiment.

When dampers 46, shutters 13' and trap door 29' are closed and fan 43 is operating, a portion of the air pushed by fan 43 will move rearwardly of the fan through openings 45, so as to reduce suction behind the fan and thus prevent overloading of the same.

The hot air provided by fan 47 and heating unit 49 will completely mix with the fresh air and with the recirculated air in the plenum formed by chamber 40 before being discharged between louvers 41 and 42.

Separate thermostats controlling fans 43 and 47 may be provided side by side in the room for independently controlling heating and ventilation.

While preferred embodiments in accordance with the invention have been illustrated and described, it is understood that various modifications may be resorted to.

What I claim is:

1. A ventilating system comprising a housing adapted to be installed in an opening of an external wall of a room to be ventilated in such a manner that the housing will have an external and an internal portion, said external portion comprising an air intake opening, said internal portion having an air discharge opening, power-operated air circulating means disposed within said housing, the zone of said housing between said air intake and said power-operated air circulating means defining an air mixing chamber, said chamber provided with damper openings located in the internal portion of said housing and in communication with said room, adjustable dampers mounted in said damper openings, whereby in the completely closed position of said dampers, the air circulated will be substantially 100% fresh air from the exterior and in various adjusted positions of said dampers, the proportion of fresh air will be mixed with a variable proportion of air from the room, a shutter system for said air intake automatically taking an open position or closed position depending whether or not there is partial vacuum in said zone, wherein said internal portion has an orifice made therein in the zone between said air circulating means and said air discharge opening, air heating means disposed across said orifice and second air circulating means provided adjacent to said air heating means to circulate air from said room into said housing inner portion.

2. A ventilating system as claimed in claim 1, wherein said heating means include pipes for heating fluid and spaced fins mounted on said pipe, said second air circulating means causing air circulation between said fins.

3. A ventilating system as claimed in claim 1, wherein said damper openings are provided in the lateral walls of said housing and are in the form of rectangular shaped vertically disposed openings, said dampers pivoted along an edge near to said external portion and along a vertical axis.

4. A ventilating system as claimed in claim 1, wherein said air intake opening is horizontally disposed and said shutter system includes a series of shutters pivoted at their lower end for movement between a substantially horizontal closed position and an upwardly inclined open position and a common rod pivotally connected to said shutters.

5. A ventilating system for a room comprising an intake ventilator and an exhaust ventilator, both mounted in spaced wall portions of said room, to admit fresh air into the room and to exhaust inside air from the room respectively, said intake ventilator comprising a housing adapted to be installed in an opening of an external wall of a room to be ventilated, in such manner that the housing will have an external and an internal portion, said external portion comprising an air intake opening, said internal portion having an air discharge opening, power-operated air circulating means disposed within said housing, the zone of said housing between said air intake and said power-operated air circulating means defining an air mixing chamber, said exhaust ventilator, when operating, producing an air depression in said air mixing chamber which is greater than that produced by said air circulating means, when operating, said chamber provided with damper openings located in the internal portion of said housing and in communication with said room, and a shutter system for said air intake including shutters and mounting means for said shutters causing the latter to automatically take an air intake opening closing position under action of gravity and an open position under action of a minimum air depression within said air mixing chamber, the size of the damper openings being sufficient to prevent the air depression within said air mixing chamber from reaching said minimum when said exhaust ventilator is not operating and said air circulating means are operating, but insufficient to prevent said air depression from reaching said minimum when said exhaust ventilator is operating even if said air circulating means are not operating, whereby automatic closing and opening of said shutter system depend solely on the non-operation and operation of said exhaust ventilator.

6. A ventilating system as claimed in claim 5, further including adjustable dampers mounted in said damper openings for movement between a first position fully closing said damper openings, and a second position in which the damper openings are fully open.

7. A ventilating system as claimed in claim 6, wherein said damper openings are of elongated shape and vertically disposed in the lateral walls of said internal portion of said housing, and said dampers are pivotally mounted about vertical central axes, whereby in the open position of said dampers a portion of the same protrudes inside said casing, these dampers serving to direct air entering said housing in a direction which is nearer said air circulating means as said dampers are more open.

8. A ventilating system as claimed in claim 5, wherein said air intake opening is substantially horizontally disposed and wherein said mounting means for said shutters include free pivotal connections for each shutter arranged along the lower edges of the same for movement of said shutters between a substantially horizontal closed position in which the shutters are overlapping and an upwardly inclined open position, and a common rod pivotally connected to a free edge of said shutters remote from their pivoted edges and extending transversely of said parallel axes in a substantially horizontal plane.

9. A ventilating system as claimed in claim 8, wherein said rod has an end portion protruding from the assembly of shutters and further including a weight longitudinally adjustably mounted on said rod end portion.

References Cited

UNITED STATES PATENTS

| | | |
|---|---|---|
| 1,584,990 | 5/1926 | Nesitt. |
| 2,309,224 | 1/1943 | Terry. |
| 2,787,946 | 4/1957 | Gannon. |
| 2,995,077 | 8/1961 | Kitson _____ 98—33 |
| 3,246,643 | 4/1966 | Stark. |

MEYER PERLIN, Primary Examiner

U.S. Cl. X.R.

98—38, 43, 94